United States Patent [19]

Abbondanti et al.

[11] 4,173,779
[45] Nov. 6, 1979

[54] SINGLE-POLE COMMUTATION CIRCUIT

[75] Inventors: Alberto Abbondanti, Penn Hills; Andress Kernick, Murrysville Borough, both of Pa.

[73] Assignee: Westinghouse Electric Corp., Pittsburgh, Pa.

[21] Appl. No.: 967,829

[22] Filed: Dec. 8, 1978

[51] Int. Cl.² .................................. H02M 3/315
[52] U.S. Cl. .................................. 363/27; 363/124; 363/135
[58] Field of Search ............... 307/252 M; 363/27, 71, 363/96, 124, 135

[56] References Cited

U.S. PATENT DOCUMENTS

| | | | |
|---|---|---|---|
| 3,406,329 | 10/1968 | French | 363/135 |
| 3,621,362 | 11/1971 | Schwarz | 363/27 |
| 3,766,468 | 10/1973 | Cardwell, Jr. | 363/136 |
| 3,893,015 | 7/1975 | Weil | 363/27 |
| 4,030,021 | 6/1977 | Akamatsu | 363/135 |

*Primary Examiner*—William H. Shoop
*Attorney, Agent, or Firm*—C. M. Lorin

[57] ABSTRACT

A commutation circuit for thyristors alternately turned ON by pulse width modulation (PWM) for the generation of a fundamental sine wave is characterized by two separate primary windings associated with respective positive and negative thyristors with a common secondary winding at the output, and two commutating networks for the respective poles, each including an auxiliary thyristor for fixed-commutation and the resonant combination of a capacitor and an inductor. The thyristors, the commutating networks, the DC source, and the output transformer have a symmetrical disposition as well as symmetrical commutation steps.

6 Claims, 6 Drawing Figures

SINGLE-POLE COMMUTATION CIRCUIT

BACKGROUND OF THE INVENTION

The invention relates to a commutation circuit for thyristors, in general, and more particularly to a circuit of the soft commutation type.

An auto-commutation circuit is described in "Principles Of Inverter Circuits" by B. D. Bedford and R. G. Hoft (John Wiley & Sons 1964) on page 185, FIG. 7.16. In the impulse-commutated inverter there described, auto-commutation is achieved in a push-pull fashion between the thyristors connected at the far ends of a center-tapped primary winding of the output transformer of the inverter, through respective feedback rectifiers from such primary winding. The commutation process in this circuit includes two sides of the transformer primary windings and requires hard commutation; the main drawback of such commutation circuit is its input frequency limitation.

An object of the present invention is to provide a commutation circuit of improved range in its frequency of operation.

Another object of the present invention is an improved commutation circuit which is of the single-pole type and therefore of lower cost.

SUMMARY OF THE INVENTION

In this single-pole commutation circuit each power thyristor when conductive feeds a separate transformer primary winding. Commonality is obtained at the secondary output of the transformer. Two independent commutating networks are associated with the respective power thyristors, one for the positive pole of the DC power source, the other for the negative pole. Feedback rectifiers, which are part of the respective commutation networks, are connected in antiparallel relation to a corresponding thyristor, thereby to assist in extinguishing the particular thyristor.

DETAILED DESCRIPTION OF THE INVENTION

Figure 1:
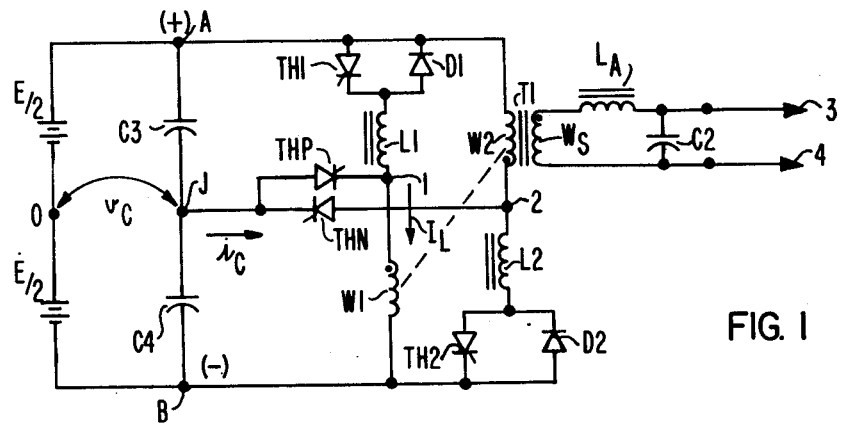
FIG. 1 shows the basic commutation circuit according to the present invention.

Referring to FIG. 1, the basic commutation circuit according to the present invention is shown applied to a thyristor $TH_1$ and a thyristor $TH_2$ forming a single-pole inverter with respect to the positive terminal A and the negative terminal B of a direct current power source of potential E obtained from two series connected sources of equal potential E/2 relative to a common zero potential connection 0. Two series-connected DC sources are considered here to provide a visualization of reference point O, used later in the discussion. However, the described circuit works as well with a single DC source E, containing inside the fictitious reference node O. The output transformer $T_1$ of this inverter includes two separate primary windings $W_1$ and $W_2$ of opposite ampere-turns and a common secondary winding $W_s$. Thyristors $TH_1$ and $TH_2$ are in two parallel current paths across AB. Each current path includes the thyristor ($TH_1$, or $TH_2$), the primary winding ($W_1$, or $W_2$), and an inductor ($L_1$, or $L_2$) in series with the associated winding (junctions 1 and 2 are between $L_1$ and $W_1$, $L_2$ and $W_2$, respectively).

With each thyristor is associated a commutation circuit combining a diode ($D_1$, $D_2$), a capacitor ($C_3$, $C_4$), and an inductor ($L_1$, $L_2$) which is resonantly charged and discharged through a corresponding auxiliary thyristor (THP for the positive side, THN for the negative side). The two capacitors ($C_3$, $C_4$) are mounted in series across the DC power source. The junction point J between the capacitors is common to the anode of one auxiliary thyristor (THP) and to the cathode of the other auxiliary thyristor (THN). Each auxiliary thyristor is further connected by its opposite electrode to the junction (1 or 2) common to the inductor ($L_1$, or $L_2$) and the primary winding ($W_1$, or $W_2$). The diodes ($D_1$, or $D_2$) are connected in anti-parallel between the anode and cathode of the associated thyristor ($TH_1$, or $TH_2$). For reason of symmetry, $C_3 = C_4$, $L_1 = L_2$ and the ampere turns of $W_1$ and $W_2$ are equal, but of opposite sign as shown by a dot on FIG. 1.

Figure 2:
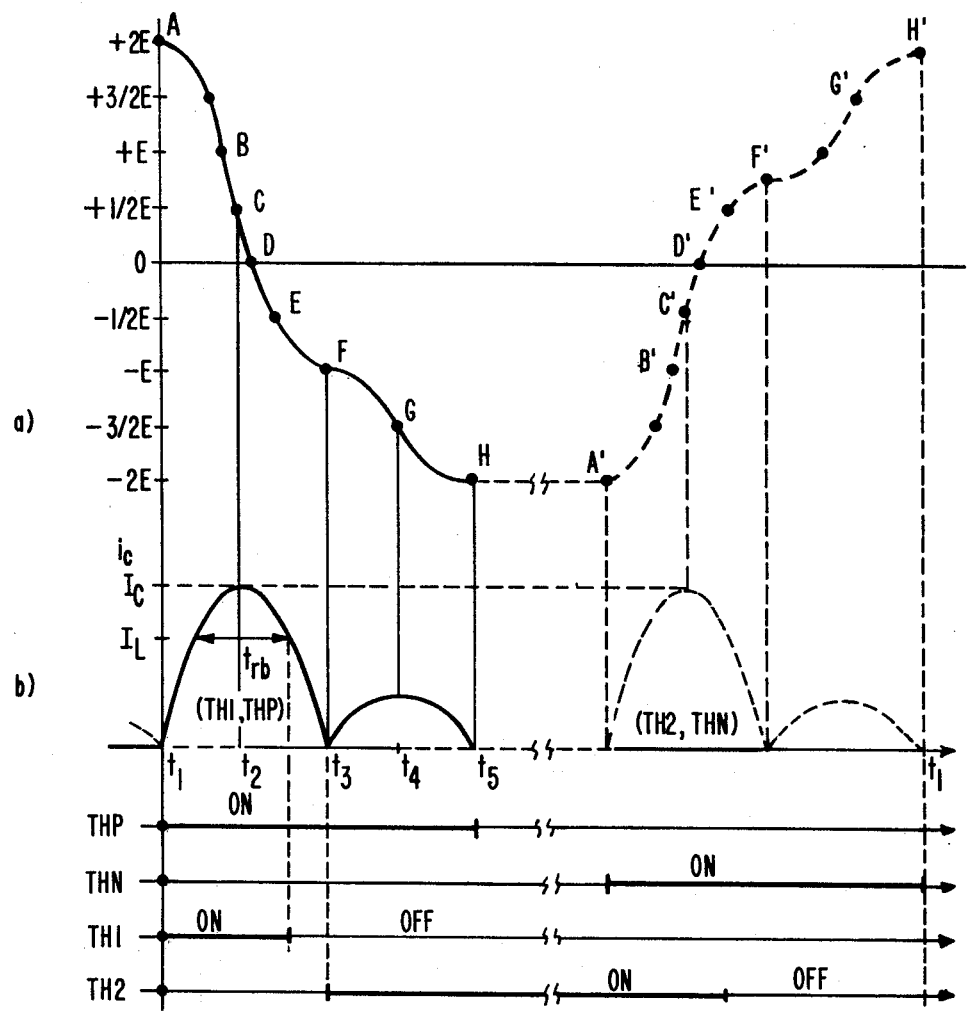
FIG. 2 illustrates with curves the commutation process in the circuit of FIG. 1.

Assuming thyristor $TH_1$ is conducting and supports a load current $I_L$ passing through $L_1$ and $W_1$ between terminals A and B, and thyristor THP is gated for conduction, a commutation current $i_c$ due to the discharge of $C_3$, $C_4$ through the inductance is flowing from junction J through THP, $L_1$ and $TH_1$, which current increases progressively until it equals $I_L$. At that moment, diode $D_1$ begins to pass a portion of $i_c$ and the current in $TH_1$ has reached zero. Starting from that instant, diode $D_1$ establishes between the two electrodes of $TH_1$ a bias voltage which extinguishes the thyristor. The discharge of the resonant circuit is shown in FIG. 2 by curves ($v_c$ and $i_c$) correlated by time instants $t_1$-$t_5$. Curves (a) show in bold line by A-H and in dotted line by A'-H' the voltage $v_c$ at point J measured with reference to reference point O in the DC source. Curves (b) show in bold line the discharge current $i_c$ through THP and in dotted line the discharge current through THN. It is understood that under pulse-width modulation (PWM) technique, the PWM controller is controlling for conduction alternately thyristors $TH_1$ and $TH_2$, at a modulation frequency throughout the fundamental of the outputted sinusoidal wave. Initially, e.g. at time ($t_1$), between points O and J the potential $v_c$ is $+E$ (due to the potential E of the source and the precharge of capacitor $C_3$). $v_c$ decreases, while $i_c$ increases sinusoidally from $t_1$ to $t_2$ to a maximum $I_c$, then, decreases sinusoidally to zero at $t_3$. In the meantime, $v_c$ experiences an inflection at time $t_2$ when $v_c = +E/2$. Further decrease brings $v_c$ down to zero and beyond. Capacitor $C_3$ ends up being charged in the opposite direction at time $t_5$. In the meantime $v_c$ after becoming negative, had reached $-E$ at instant $t_3$. Charging of $C_3$ in the opposite direction is complete at $t_5$ ($v_c = -2E$) which is the end of the cycle for the positive side commutation circuit. The junction J is now at $-2E$. The circuit is ready for providing a discharge current relative to J with the other auxiliary thyristor THN (dotted line of $i_c$). The discharge current $i_c$ for the second commutation circuit associated with TH$_2$ and diode D$_2$ is involved. The discharge current is in the opposite direction.

The equations which explain curves (a) and (b) of FIG. 2 are as follows:

$$(I_L/I_C) = \alpha \tag{1}$$

where I$_L$ is the current through thyristor TH$_1$ (or TH$_2$), I$_C$ is the maximum of i$_c$ as shown in FIG. 2, curve (b), $\alpha$ is a design parameter permitting to optimize the circuit. The optimum value of in the vicinity of $\alpha = 0.65$.

$$X = (1.5E/I_C) = \sqrt{L/C'} \tag{2}$$

where L is the inductance of L$_1$, and C' = C$_3$ + C$_4$.

$$\omega = (2 \cos^{-1} \alpha/t_{rb}) = (LC')^{-\frac{1}{2}} \tag{3}$$

where is the angular frequency of the resonant discharge, and t$_{rb}$ is the subperiod during which i$_c$ is in excess of I$_L$.

$$L = X/\omega \tag{4}$$

$$C' = (1/\omega X) = C_3 + C_4 \tag{5}$$

The initial condition is that TH$_1$ is conducting while supplying a load current I$_L$ to a typically lagging power factor load at a time (t$_1$). Capacitor C$_4$ is initially at a voltage 2.5 times the supply voltage appearing between sources E$_1$, E$_2$ (whereas C$_3$ is initially at 1.5 times that voltage) so that commutation capability is available for TH$_1$.

Curves v$_c$ and i$_c$ of FIG. 2 show the commutation process. Within the time interval t$_1$–t$_3$, the pulse period t$_{rb}$ is the effective time interval for turning OFF thyristor TH$_1$. From t$_3$ to t$_5$, the commutation circuit is being prepared for the subsequent turning OFF of thyristor TH$_2$. The commutation curves (a) and (b) for TH$_2$ (in dotted line on FIG. 2) are the same as the ones for TH$_1$, except that, being for the negative side, the initial capacitor charging is −2E and i$_c$ is flowing through THN, e.g. in the direction opposed to the arrow shown in FIG. 1.

The initial +2E level of precharged capacitors C$_3$ and C$_4$ when commutating TH$_1$ (or −2E when commutating TH$_2$) assures a balanced and continuous operation. Thus commutation sequence leads to a precharging to exactly −2E in the opposite direction of capacitors C$_3$ and C$_4$ which in turn through symmetrically operating thyristors, brings C$_3$ and C$_4$ during the complementary half period back to +2E. Also, should the initial voltage of junction J be too high, or too low, the process is self-correcting by bringing back the capacitors to then unique initial condition when damping effects due to the load and the fact that the components are less than ideal, are taken into account.

Also, as shown in FIG. 2 curve (b), current i$_c$ exhibits two consecutive pulses. The major pulse (from t$_1$ to t$_3$) passes to the cathode of TH$_1$ from auxiliary thyristor THP. Through TH$_1$ the major pulse initially bucks the flow of forward current and thus causes the net forward current to gradually decrease to zero, as required in a "soft" commutation process. After the forward current in TH$_1$ has reached zero, the excess of major pulse current is carried by D$_1$, which then presents to TH$_1$ the reverse threshold level of "soft" commutation. Commutation is accomplished when the major pulse magnitude, for the subperiod t$_{rb}$, provides current in excess of what is demanded by the load, I$_L$.

The minor current pulse (from t$_3$ to t$_5$) results from the firing of TH$_2$ while THP is still in the ON state. The voltage induced through inductor L$_2$ across winding W$_2$ and reflected through winding W$_1$ tends to drive node J to −E relative to the negative rail. Since at that time the commutation capacitors (C$_3$ and C$_4$) are already at the level −0.5E relative to the negative rail, at the completion of the major pulse, the −0.5E net drive from the minor pulse "rings up" an additional −E into the commutating capacitors which end up to the level −2E.

Thus, the current duty of auxiliary thyristor THP, or THN, includes one major and one minor pulse per total period. The two commutating capacitors (C$_3$ and C$_4$) share the total period duty cycle for a total of two major and two minor pulses.

The five above-mentioned equations define the component parameters of the commutation circuit when t$_{rb}$ is determined, say 1.5 times the guaranteed thyristor turn-off time. For 60 Hertz at the output this guaranteed capability on "soft" commutation should be 15 microseconds or less, which is currently available commercially.

The basic circuit of FIG. 1 provides a force-commutated thyristor single-pole power stage which is capable of outputting a sine wave voltage waveform if properly controlled through known AC wave synthesis techniques. It can be made part of various AC generating systems, such as one using the programmed waveform feed-forward technique (see Proceedings of the 23rd Power Sources Conference of May 1969, pages 59–63, "Programmed Waveform Static Inverter" by I. U. Hague and A. Kernick), or one using the self-oscillatory SPFM (Synchronous Pulse Frequency Modulation) feedback time-optimal-response technique (see "Static Inverter With Synchronous Output Waveform Synthesized By Time-Optimal-Response Feedback", in IEEE-PESC Record, Lewis Research Center, June 1976 by A. Kernick, D. L. Stechschulte and D. W. Shireman).

This circuit satisfies the requirements of a small uninterruptible power supply (UPS) system, typically in the range from 1 to 15 KVA with 50/60 Hertz, single phase 120 vac sinusoidal output with a maximum of 5% total harmonic distortion (THD). It overcomes the drawbacks of the inverter of the prior art in such small UPS systems, namely: (1) an unregulated squarewave driving thyristor connected with a center-tap ferro-resonant constant voltage transformer. Indeed, a ferro-resonant transformer is heavy and costly; (2) a regulated quasi-square wave driving thyristor connected with a large output filter. The filter constitutes another drawback; and (3) a programmed waveform constructed by pulse-width modulation with transistors. The limitation here lies in the use of transistors.

The commutation circuit of FIG. 1 allows the use of thyristors in an inverter type of converter, having freewheeling diodes whose forward drops impose "soft" commutation recovery times of the order of 15 microseconds in the TH$_1$ and TH$_2$ thyristors. This is a cost effective substitute for transistors when a 5% total harmonic distortion is allowable for 50/60 Hertz output, where as many as 10 commutation cycles may be experienced per half-cycle of the fundamental.

Figure 3:
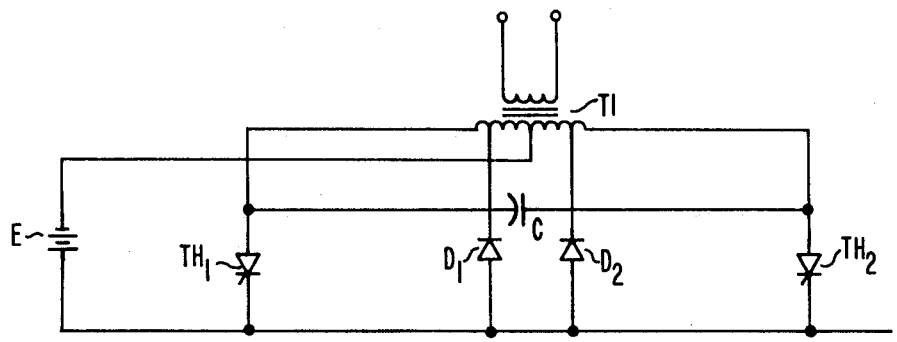
FIG. 3 is an auto-commutation circuit of the prior art.

FIG. 1 is to be compared with a well-known commutation circuit known as the McMurray-Bedford. As shown in FIG. 3, the prior art circuit involves two thyristor $TH_1$, $TH_2$ coupled to the respective ends of the primary of a center-tap transformer $T_1$. These thyristors are commutated in a push-pull fashion by a capacitor C interconnecting both anodes for hard commutation and feedback rectifiers are provided to regulate trapped energy. This prior art circuit cannot operate at high frequency. In contrast, the basic circuit of FIG. 1 involves forced and "soft" commutation made possible by a separation of the two halves of the transformer primary, allowing the provision of two commutation circuits about a common junction point, and the creation of a virtual midpoint between the positive and negative poles of the DC power source.

The basic circuit of FIG. 1 is capable of various applications.

Figure 4:
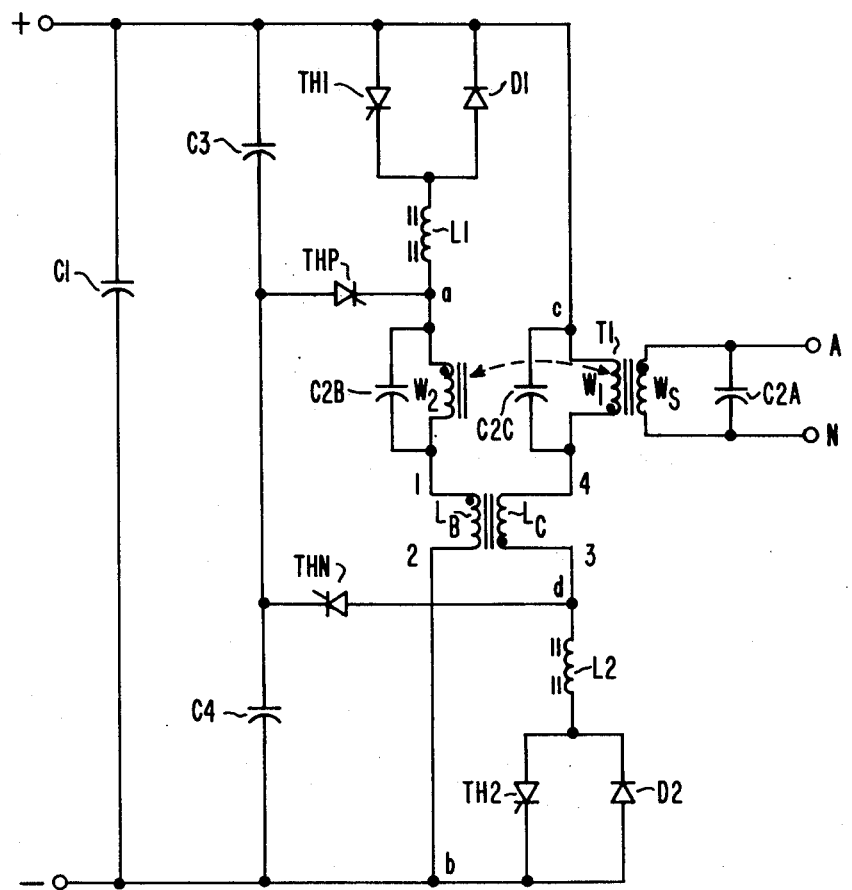
FIG. 4 is a single-pole power stage for sinusoidal single-phase output using the commutation circuit of FIG. 1.

In FIG. 4 a circuit arrangement is shown allowing attenuation of high frequency flux components in the transformer. Two closely coupled inductors $L_B$ and $L_C$ are placed on the primary side of $T_1$ to play the same role as $L_A$ in FIG. 1. This technique is old and can be found in U.S. Pat. No. 1,758,680 of May 13, 1930 of H. G. André, known as the André choke. At nearly unity coupling the choke acts as an AC output filter at the primary side of the transformer, and also serves as a high-frequency magnetic core buffer for the power transformer. Dual purpose bypass and output filter capacitors $C_{2B}$ and $C_{2C}$ shown in FIG. 4 are also provided so that the flux in the $T_1$ transformer core is subject to a negligible amount of high frequency volt-second components when the inverter is part of a bang-bang control system. Chokes $L_1$ and $L_2$ serve the dual purpose of commutation circuit resonance and di/dt suppression for the thyristors.

From the above, it appears that transformer $T_1$ is of the fundamental frequency type, of low cost since high-frequency requirements to be met for the core and the coils are not required. When the inverter is part of a time-optimal-response control system of the aforementioned SPFM mode, since such system eliminates overvoltage transients and core saturation, only a minimum of volt-seconds need be provided in the power transformer. In such case, while the transformer iron is fully utilized at high flux density, feedback control stabilizes operation upon a minor hysteresis loop so that unusually quiet operation is obtained.

More generally, the thyristor approach is a good substitute at power levels above 5 KVA for the transistor approach such as in U.S. Pat. No. 3,636,430 of Kernick et al. Thyristors are less costly when large switching devices are needed. Moreover, whenever very fast switching thyristors become commercially feasible, the circuit of FIG. 4 is readily adapted to a 400 Hertz AC output delivery.

Figure 5:
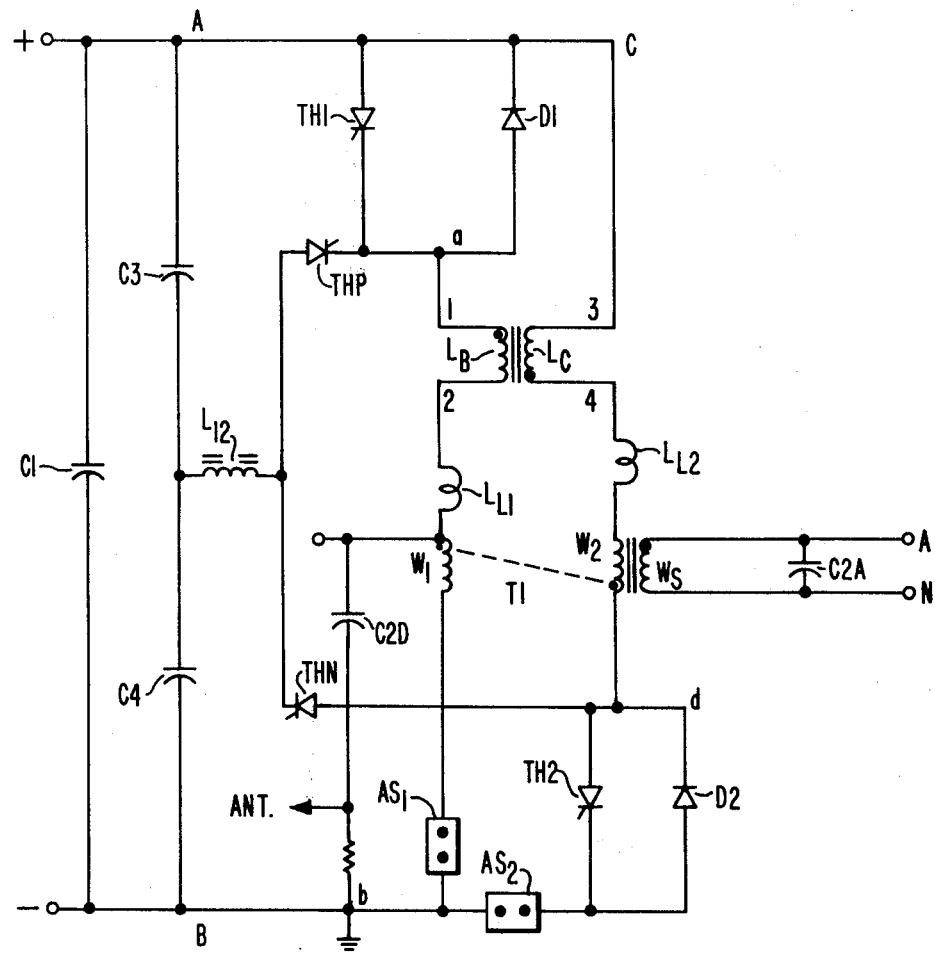
FIG. 5 is a low-cost version of the commutation circuit of FIG. 1.

A cost reduction for uninterruptible power supply (UPS) system applications is readily obtainable from the circuit of FIG. 4, as shown in FIG. 5. In this situation, the design results from the three following modifications:

1. The André Choke cost has been reduced by relaxing the tight coupling requirement between windings, thus introducing an amount of leakage reactance useful for limiting di/dt.
2. A single commutation choke has been used located at the junction of THN and THP to serve both auxiliary thyristors. This can be done since the Andre Choke leakage serves the secondary function of $L_1$ and $L_2$ in FIG. 4, which is to limit the di/dt in $TH_1$, $TH_2$.
3. 1 Each half primary of the power transformer is connected with one side to the negative rail which is also the logic common. From the common point b all feedback sensing devices for output voltage, current (see $AS_1$, $AS_2$ for illustration on FIG. 5) and anticipation can be made directly, or by shunt resistors, without need of any additional magnetic components. Two current transformers and a potential transformer are thereby eliminated.

Such cost reduction measures are available without first-order degradation of performance.

Peak voltage stress on the thyristors in the new inverter is, in the example shown, 3.5E. This is not surprising since voltage doubling stress is normally encountered with "center-tap" circuits. Inverter-type thyristors up to a 600-volt rating are readily available for $TH_1$ and $TH_2$, which permit application of the "center-tap" circuit on battery supplies up to 150 volts, or somewhat more. THP and THN may be of lesser current rating and are acceptable with more conventional recovery times, say 40 microseconds.

Figure 6:
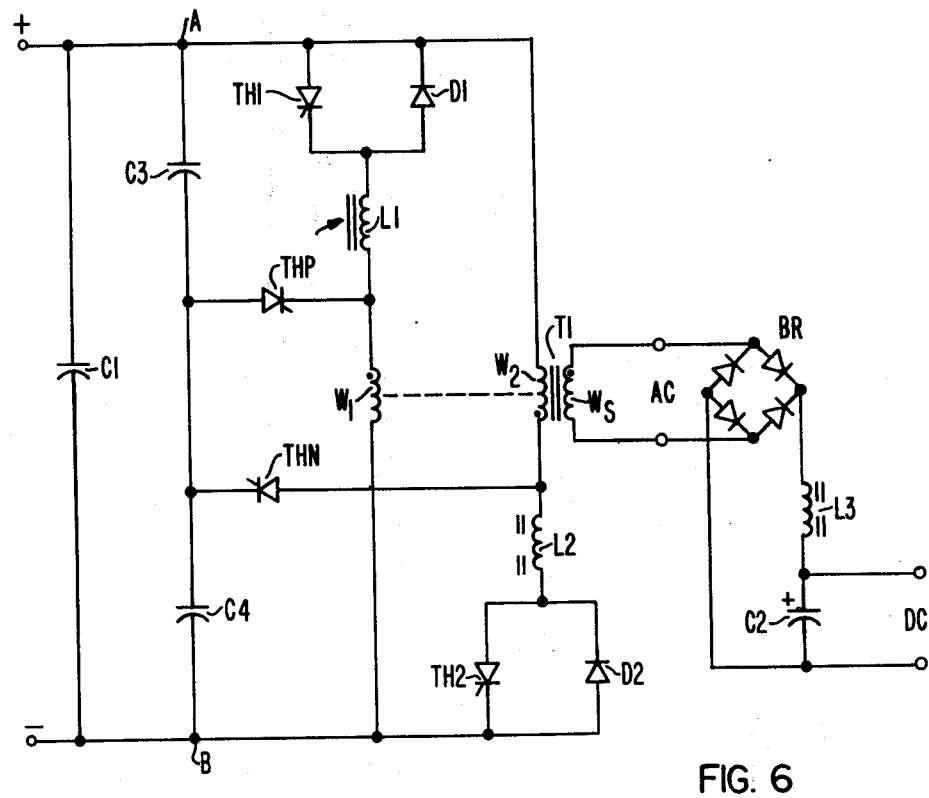
FIG. 6 shows the commutation circuit of FIG. 1 applied to a DC/DC regulator.

FIG. 6 relates to a configuration of the circuit of FIG. 1 suitable for a DC to DC PWM Transformer-type converter. Although some square-wave DC to DC inverter applications of the basic circuit of FIG. 1 are available, a full-bridge rectifier BR with DC output filter, $L_3$, $C_2$, as shown in FIG. 6, constitutes for DC to DC and PWM conversion with regulation a more important configuration. With fast switching thyristors, a high-frequency capability, perhaps as high as 30 kHz, may be available, thereby to make DC to DC conversion with this new circuit of special importance.

In order to introduce PWM voltage control, two inactive periods per cycle must be introduced. During each of these periods, the bridge BR is "free-wheeling" on the $L_3$ filter choke current and all thyristors must then be extinguished. Referring to FIG. 2B, the commutation capacitors do swing to a level of $-0.5E$ below the negative rail, following the major pulse through THP, and to $+0.5E$ above the positive rail, following the major pulse through THN. Since the "free-wheeling" current through bridge BR clamps the transformer voltage to nearly zero, two opportunities per cycle to have all thyristors extinguished at the same time are afforded by this new commutation arrangement. These OFF periods can be extended indefinitely as required. In fact, the converter can be shut down at any such period should the control logic suppress further thyristor firing.

We claim:

1. In a commutation circuit for alternately commutating a first and a second main thyristor connected in parallel across the poles of a direct current power source, the combination of:

a positive pole network for commutating said first thyristor in relation to the positive pole of said source;

a negative pole network for commutating said second thyristor in relation to the negative pole of said source;

said first thyristor when conductive establishing a first current path across said DC source, said first current path including in series a first inductor and a first primary winding;

said second thyristor when conductive establishing a second current path across said DC source, said second current path including in series a second inductor path and a second primary winding;

said first and second primary windings being driven in opposite directions;

a common secondary winding responsive to said first and second primary windings for outputting AC power converted by said first and second thyristors from said DC source;

said positive pole commutating network including a first capacitor associated with said positive pole, a first auxiliary thyristor, said first inductor and a first diode connected in antiparallel relation to said first thyristor;

said negative pole commutating network including a second capacitor associated with said negative pole, a second auxiliary thyristor, said second inductor and a second diode connected in antiparallel relation to said second thyristor;

with said first and second capacitors and said first and second auxiliary thyristors having a common junction point.

2. The commutation circuit of claim 1 with said first and second inductors being combined into a common inductor connected between on the one hand said first and second auxiliary thyristors and on the other hand said first and second capacitors, at said common junction point.

3. The commutation circuit of claim 1 with second and third auxiliary windings at substantially unity coupling to each other, connected in the respective said first and second current paths.

4. The commutation circuit of claim 1 with filtering means associated with said first and second primary windings, respectively.

5. The commutation circuit of claim 1 with filtering means associated with said common secondary winding.

6. The commutation circuit of claim 1 with rectifier means associated with the output of said common secondary winding for outputting direct current in relation to said direct current power source.

* * * * *